3,504,943
DEEP SEA NODULE MINING
James E. Steele, Quakertown, and George W. Sheary, Bethlehem, Pa., assignors to Bethlehem Steel Corporation, a corporation of Delaware
Continuation-in-part of application Ser. No. 714,838, Mar. 21, 1968. This application Oct. 8, 1968, Ser. No. 772,448
Int. Cl. E02f 7/06; E21c 45/00
U.S. Cl. 299—8          1 Claim

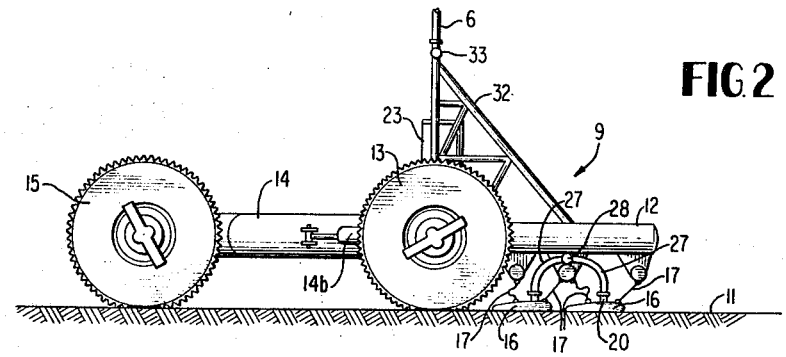
FIG.2
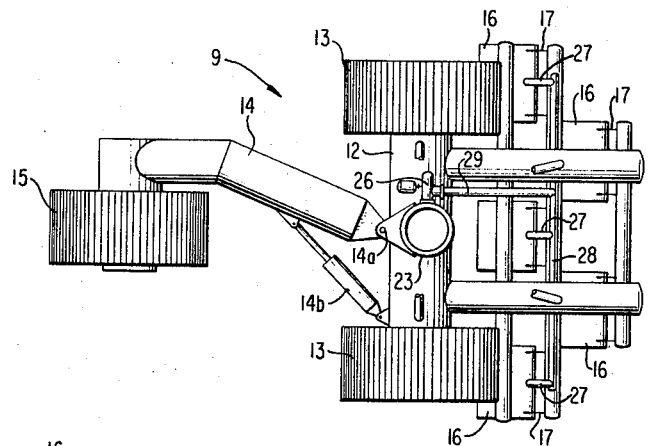
FIG.3
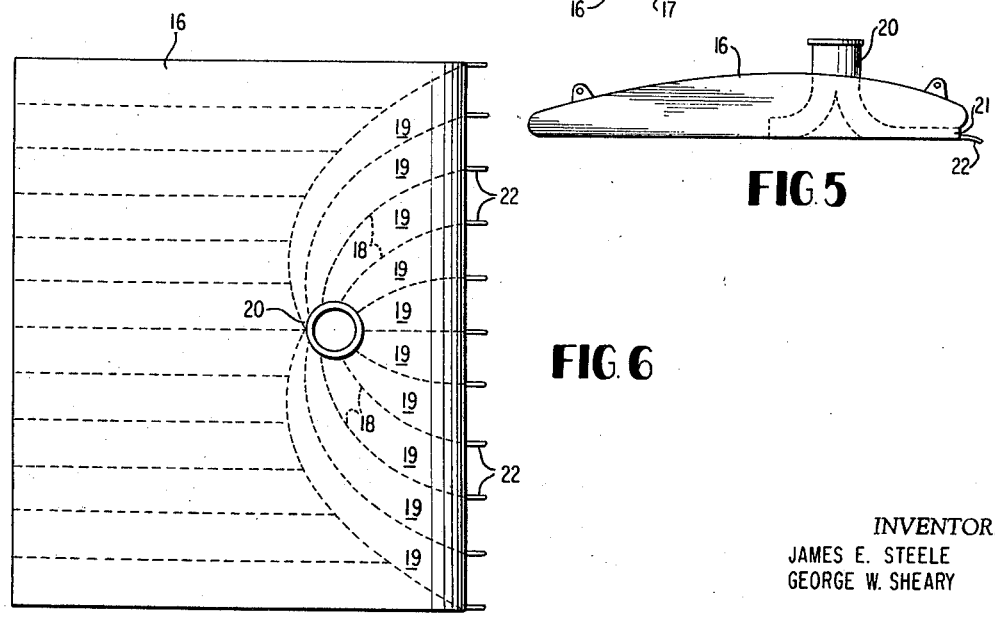
FIG.5
FIG.6
INVENTORS
JAMES E. STEELE
GEORGE W. SHEARY INVENTORS
James E. Steele
George W. Sheary United States Patent Office 3,504,943
Patented Apr. 7, 1970

ABSTRACT OF THE DISCLOSURE

Bottom crawler traverses marine floor under control of floating vessel. Suction pump on crawler picks up water and solid material through collector sleds and delivers same to separator on crawler. Large solids fall to bottom of separator, while smaller solids and water flow out top of separator. Another pump in riser pipe communicating between crawler and floating vessel creates fast upwardly moving stream of water entraining large solids from bottom of separator and transporting said solids to floating vessel.

CROSS-REFERENCES TO RELATED APPLICATIONS

This is a continuation-in-part of application Ser. No. 714,838, filed Mar. 21, 1968, now abandoned.

BACKGROUND OF THE INVENTION

This invention relates generally to apparatus for mining solid material, either organic or inorganic, of a predetermined minimum size, from the floor of a body of water. More particularly, this invention relates to apparatus for collecting solid material from the surface of, or immediately below, the ocean floor, for separating nodules, e.g. manganese nodules, of a predetermined minimum size from smaller nodules and sand and mud, and for transporting substantially only the nodules of said predetermined minimum size to the ocean surface in an entraining stream of water.

Apparatus of this general type is broadly old in the art. However, such apparatus is somewhat inefficient, as relatively large quantities of water are required to transport the desired nodules to the surface.

One of the objects of this invention is to provide improved apparatus for mining modules from the surface of the ocean floor.

Another of the objects of this invention is to provide improved apparatus for mining nodules from the surface of the ocean floor, said apparatus including means for transporting said nodules to the ocean surface which utilizes a relatively very small amount of entraining water.

SUMMARY OF THE INVENTION

Briefly, we have discovered that the foregoing objects can be attained by providing a bottom crawler adapted to traverse the ocean floor under control of a floating vessel, means to pick up water and solid material from the vicinity of the ocean floor, a separator mounted on the crawler to receive said water and solid material and separate nodules of a predetermined minimum size from smaller nodules and non-nodular material, and a pump in a riser pipe communicating between the crawler and the floating vessel to create a fast upwardly moving stream of water to entrain said nodules of a predetermined minimum size at the bottom of the separator and to transport these nodules to the floating vessel.

BRIEF DESCRIPTION OF THE DRAWINGS

FIGURE 2 is a side elevation of the bottom crawler.

FIGURE 3 is a plan view of the bottom crawler.

FIGURE 4 is an enlarged side elevation view, partially in medial section, of the separator.

FIGURE 5 is a side elevation of one of the collector sleds.

FIGURE 6 is a plan view of one of the collector sleds.

DESCRIPTION OF THE PREFERRED EMBODIMENT

Figure 1:
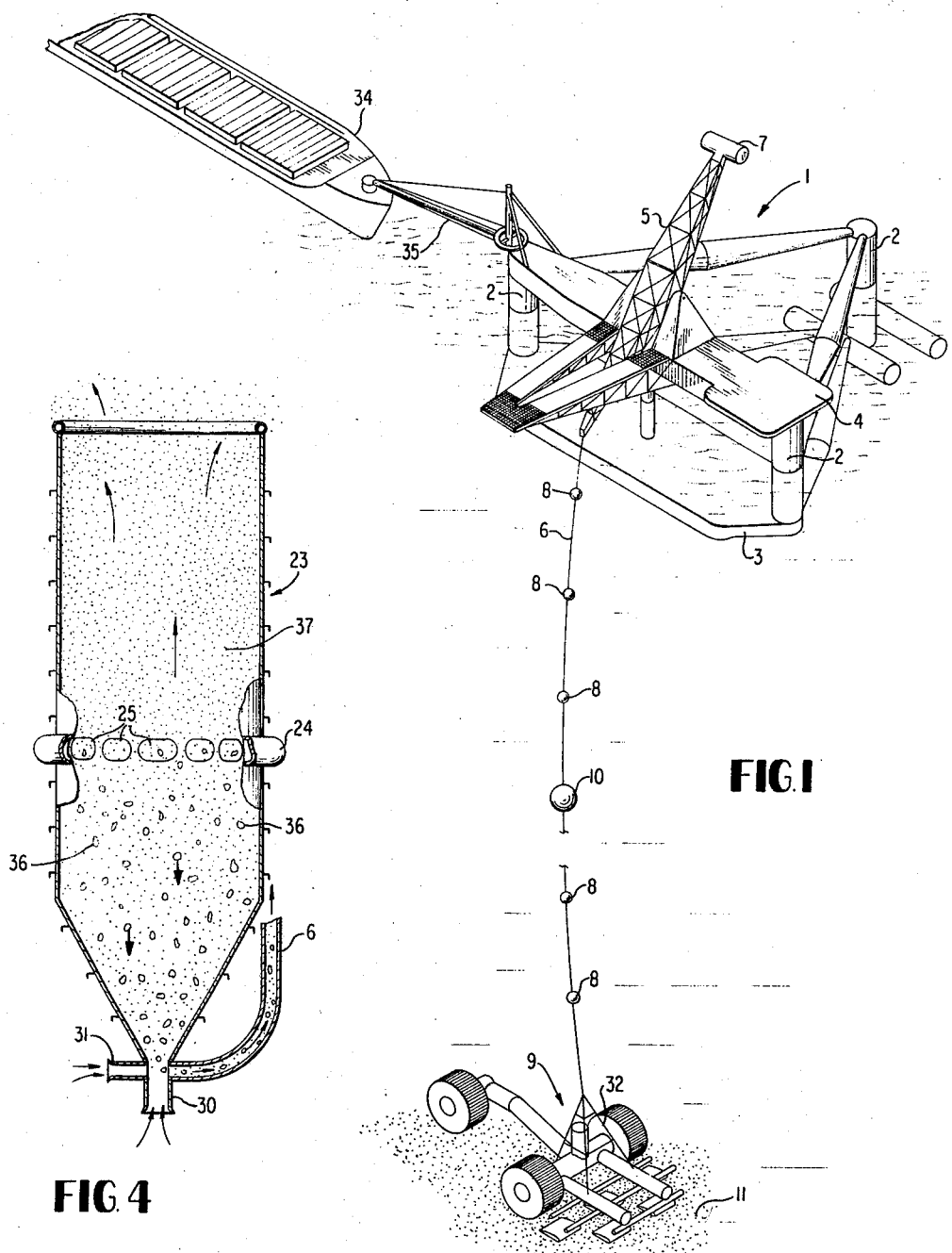
FIGURE 1 is an isometric view showing the floating vessel, having an ore ship moored thereto, at the surface of the body of water, and showing the bottom crawler in operative position on the marine floor.

Floating vessel 1, the center of operations, is of the well-known "column-stabilized" type, comprising stabilizing columns 2 mounted on a base 3 and supporting and operating platform 4. Propulsion means (not shown) is provided on surface vessel 1 to move the same in a desired direction at a desired velocity.

Boom 5, pivotally mounted on operating platform 4, supports riser pipe 6 and is provided with counterweight 7, thereby preventing sudden stresses from being imposed on riser pipe 6 due to changes in bottom topography or wave motion.

Riser pipe 6 is provided with buoyancy means, e.g. spheres 8, at spaced intervals to buoyantly support the pipe 6, thereby preventing the entire weight thereof from being imposed on itself or on boom 5. When it is considered that mining operations may conceivably be conducted in 18,000 feet of water, it will be appreciated that the dead weight of pipe 6 can be considerable. The bottom end of riser pipe 6 extends down to bottom crawler 9 in a manner to be described. At a point intermediate the ends of riser pipe 6, a combination buoyancy sphere and pump chamber 10 is provided, housing a multistage centrifugal pump (not shown), the intake of the pump communicating with that portion of pipe 6 lying below sphere 10 and the discharge of the pump communicating with that portion of pipe 6 lying above sphere 10.

Bottom crawler 9 is a self-propelled vehicle adapted to traverse the marine floor 11 in a desired direction at a desired velocity, and comprises frame 12 on which tractor wheels 13, each with deep treads, are rotatably mounted, subframe 14 on which tractor wheel 15, also with deep treads, is rotatably mounted and pivotally connected to frame 12 at joint 14a for movement in a horizontal plane. Hydraulically operated cylinder 14b is interposed between frame 12 and subframe 14 and can be extended or retracted to change the angular relation between frame 12 and subframe 14 thereby to steer the bottom crawler 9.

Enclosed within frame 12 and tractor wheels 13 are various components (not shown) constituting a drive for said tractor wheels 13. Similarly enclosed within subframe 14 and tractor wheel 15 may be similar various components (not shown) constituting a drive for tractor wheel 15.

The dead weight of bottom crawler 9 on marine floor 11 is reduced by suitable means such as foam or gasoline provided within frame 12 and subframe 14.

Figure 4A:
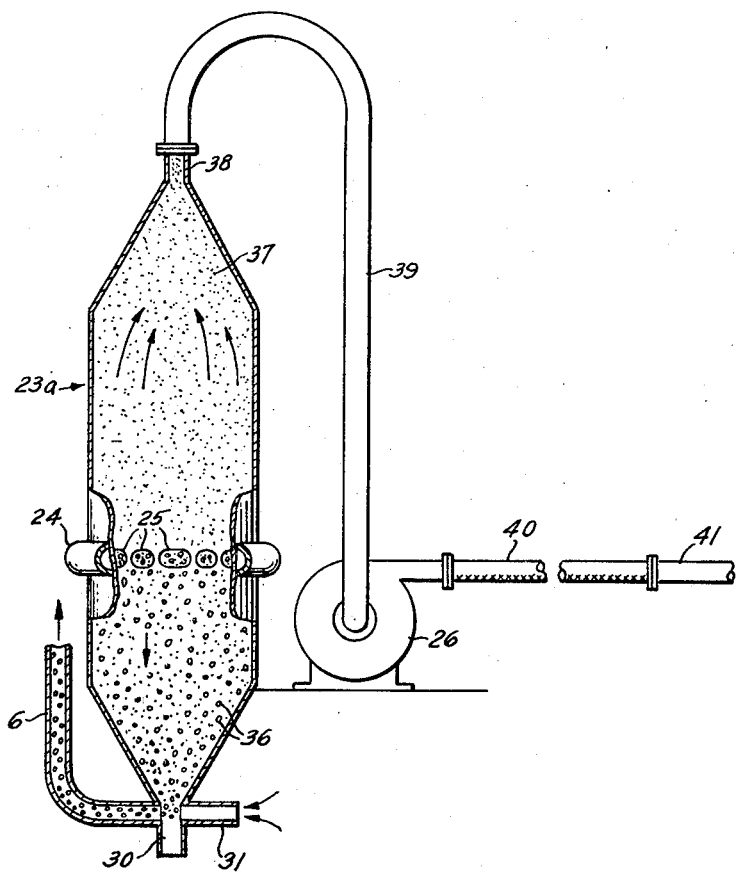
FIGURE 4A is an enlarged side elevation view, partially in medial section, of an alternative separator.

Means is provided to pick up water and solid material from the vicinity of the ocean floor and deliver the same to either the separator 23, shown in detail in FIGURE 4, or the separator 23a, shown in detail in FIGURE 4A. Said means broadly comprises collector sleds 16, which are supported from frame 12 by means of cables 17 in staggered relation along the front of bottom crawler 9, as shown in FIGURE 3, and are adapted to be run along the marine floor 11. Each collector sled 16 comprises a number of curved baffles 18 defining a plurality of contiguous conduits 19, all of said conduits 19 communicating with a suction pipe 20, each conduit 19 decreasing in cross-section from the front of the collector sled 16 to the said suction pipe 20 whereby to increase the velocity of water and solid material as the same proceeds through the conduits 19 from the front of the collector sled 16 to the suction pipe 20. All conduits 19 communicate with the body of water surrounding collector sled 16 through transverse slot 21 running across the front of said collector sled 16. Adjustable flexible fingers 22 are spaced along the front of collector sled 16 at the bottom thereof to aid in freeing and raising nodules to the area of influence of the streams of water entering conduits 19, thereby to permit said nodules to be entrained in such streams of water. Those internal portions of collector sleds 16 lying outside conduits 19 may be buoyed with permanent buoyancy material (not shown) to reduce the bearing load of the collector sleds 16 on marine floor 11.

Pump 26 is suitably supported on frame 12. Referring more specifically to FIGURE 3 and the separator shown in FIGURE 4, each of the suction pipes 20 of the several collector sleds 16 communicates through flexible conduit 27 with manifold 28, said manifold communicating with the suction side of pump 26 through conduit 29.

The discharge side of pump 26 communicates with a separator 23, the function of which is to separate solids of a predetermined minimum size from smaller solids and substantially all of the collected water. The separator 23 is mounted on the frame 12, and broadly comprises a vessel having an upper end out of which said smaller solids and substantially all of said collected water flow, a lower end having a discharge opening toward which solids of a predetermined minimum size fall, and inlet means disposed between said upper end and said lower end. Said upper end is substantially completely open while said lower end is substantially completely enclosed whereby the discharge from the pump 26 results in an upward flow of water within the separator 23 from its point of entry therein. The discharge from the pump 26 enters separator 23 through inlet means comprising spaced apertures 25 in the wall of the separator 23, said apertures being enclosed by a conduit 24 extending around the wall of the separator and communicating with the discharge side of pump 26. Said pump 26 introduces water and solid material into said inlet means under pressure.

As is shown in FIGURE 4, the upper section of separator 23 is cylindrical, while the lower section is conical so that falling nodules are guided toward the apex of the cone, i.e. the bottom of the vessel. The bottom of the separator 23 is provided with an apertured neck 30 to which riser pipe 6 is connected. Additionally, another apertured tube 31 may be mounted on the bottom of separator 23 in registry with riser pipe 6.

An improved separator arrangement is shown in FIGURE 4A. In this arrangement, the manifold 28 communicates directly through conduit 29 with the conduit 24 extending around the wall of the separator 23a and the pump 26 is connected to the discharge side of the separator. The separator 23a differs from the separator 23 in that the upper end of the former is conical, the apex 38 thereof communicating via a conduit 39 with the suction side of pump 26. The discharge side of the pump 26 is connected to a flexible hose 40 and an exhaust pipe 41, the pipe 41 extending beyond the rear of the crawler 9 whereby smaller solids are discharged to rear of wheel 15.

By connecting the pump 26 to the discharge side of the separator 23a, only small nodules pass through the pump 26; hence, there is less degradation of large nodules and less wear on the pump 26 than in the embodiment wherein the pump 26 is connected to the intake side of the separator 23.

Bottom crawler 9 is provided with a pick-up frame 32 mounted on frame 12, and a swivel pipe joint 33 in the line constituting riser pipe 6 is supported at the upper end of pick-up frame 32, whereby to permit some freedom of angular movement of riser pipe 6 adjacent the bottom crawler 9.

As shown in FIGURE 1, an ore vessel 34 is moored to floating vessel 1, through mooring boom 35, and a loading pipe (not shown) extending through mooring boom 35 from floating vessel 1 to ore vessel 34 permits the nodules to be transferred from the floating vessel 1 to the ore vessel 34.

The operation of the above apparatus will now be described with reference to the separator shown in FIGURE 4.

The bottom crawler 9 is lowered from the surface of the body of water to the marine floor 11 by adding extensions to the riser pipe 6 after gasoline, for example, has been added to frame 12 and subframe 14 to reduce the dead weight of the bottom crawler 9.

Floating vessel 1 is propelled in the desired direction, carrying with it ore vessel 34 moored thereto, and bottom crawler 9 is propelled in the same direction and at the same velocity, being controlled remotely by suitable means not shown but understood by those familiar with this art.

The pump (not shown) in sphere 10 is operated to create a fast upwardly moving stream of water in riser pipe 6. For example, said pump may operate at a pressure of 2,400 p.s.i. to raise 3,700 g.p.m. of water at a velocity of about 15 feet per second.

Pump 26 is then operated to draw into collector sleds 16 water and solid material, this water and solid material being delivered by pump 26 into separator 23. Said pump may operate at a pressure of 10 p.s.i. and collector 75,000 g.p.m. of water.

The water entering the separator 23 will flow almost entirely out of the top of the separator, inasmuch as, for all practical purposes, the bottom of the separator is enclosed. For example, the upper end of the separator may be 15 feet in diameter, while the apertured neck 30 may be 10 inches in diameter. The ratio of the cross-sectional areas of the upper end to the apertured neck is thus about 320 to one.

The solid material entering the separator through apertures 25 is characterized by a certain fall velocity, said velocity being dependent primarily on the density, size and shape of the material. If this fall velocity is greater than the velocity of the rising water in the separator, the material will fall to the bottom of the separator and be entrained in the stream of water flowing through the riser pipe 6. By controlling the velocity of the water flowing upwardly in the separator, the degree of separation can be controlled. For example, an upward flow of about one foot per second will result in nodules 36 having a cross-section of ⅜ inch and larger falling to the bottom of the separator, while smaller nodules and non-nodular material, i.e. sand and mud 37, will be carried out the top of the separator. The upward velocity in the separator is a function of the separator shape and size, and also the volume of discharge of the pump 26.

The operation of the subject apparatus is substantially the same when the separator arrangement shown in FIGURE 4A is utilized. In this case, however, the pump 26 sucks collected water and small solid material out of the separator 23a.

The amount of water utilized in transporting the desired nodules to the ocean surface is about one-twentieth of the amount utilized in picking up the nodules from the ocean floor.

Apertured tube 31 permits the nodule-entraining steam of water to pass across the open bottom of separator 23 or 23a without making a change in direction.

Apertured neck 30 permits nodules 36 to drop out of the separator in the event there is a malfunction of the pump in sphere 10 while pump 26 is operating. In this manner choking up of the separator is avoided. If desired, a spring-loaded closure may be disposed across the bottom of neck 30.

As the nodules reach the floating vessel 1, they are transferred to ore vessel 34 where they are separated from the entraining water.

Upon completion of operations, the bottom crawler 9 may be raised from marine floor 11 by removing the extensions from the riser pipe 6.

While the invention has been described in connection with the mining of nodules from the ocean floor, the subject apparatus may also be utilized for mining living organisms, e.g. clams, oysters and the like.

What is claimed is:
1. Apparatus for mining solid material from the floor of a body of water, comprising:
   (a) a vehicle adapted to travel along said floor,
   (b) pump means mounted on said vehicle,
   (c) a vessel mounted on said vehicle, said vessel having an upper end communicating with the intake of said pump means, a lower end having a discharge opening therein, and inlet means, disposed between said upper end and said lower end, for receiving solids and water collected from the vicinity of said floor, said vessel cooperating with said pump means whereby solids of a predetermined minimum size fall toward said discharge opening, while smaller solids and substantially all of said collected water flow into the intake of said pump means,
   (d) collecting means, comprising a plurality of contiguous conduits adapted to bear on and travel along the floor of said body of water, said collecting means communicating with the inlet means of said vessel and adapted to suck water and solid material therein as a result of pressure from said pump means, and
   (e) means, communicating with the lower end of said vessel, for transporting said solids of a predetermined minimum size to a vessel at the surface of said body of water.

References Cited
UNITED STATES PATENTS

| | | | |
|---|---|---|---|
| 1,908,102 | 5/1933 | Arledter. | |
| 2,981,413 | 4/1961 | Fitch | 209—211 |
| 3,429,062 | 2/1969 | Nelson | 37—57 |
| 3,433,531 | 3/1969 | Koot et al. | 229—8 |

ERNEST R. PURSER, Primary Examiner

U.S. Cl. X.R.

37—59; 209—211